(12) United States Patent
Livingston

(10) Patent No.: US 10,430,380 B2
(45) Date of Patent: Oct. 1, 2019

(54) TRACKING A LARGE VARIETY OF RECORD TYPES WITH A SMALL ARRAY

(71) Applicant: CA, Inc., New York, NY (US)

(72) Inventor: Michael D. Livingston, Germantown, MD (US)

(73) Assignee: CA TECHNOLOGIES, INC., New York, NY (US)

( * ) Notice: Subject to any disclaimer, the term of this patent is extended or adjusted under 35 U.S.C. 154(b) by 211 days.

(21) Appl. No.: 15/783,627

(22) Filed: Oct. 13, 2017

(65) Prior Publication Data
US 2019/0114329 A1     Apr. 18, 2019

(51) Int. Cl.
*G06F 16/14* (2019.01)
*G06F 16/13* (2019.01)
*G06F 16/17* (2019.01)

(52) U.S. Cl.
CPC ............ *G06F 16/148* (2019.01); *G06F 16/13* (2019.01); *G06F 16/134* (2019.01); *G06F 16/1734* (2019.01)

(58) Field of Classification Search
CPC .......................... G06F 16/148; G06F 16/1734
See application file for complete search history.

(56) References Cited

U.S. PATENT DOCUMENTS

2012/0030225 A1* 2/2012 Muller ................... G06F 16/21
707/760

* cited by examiner

*Primary Examiner* — Hosain T Alam
*Assistant Examiner* — Anthony G Gemignani
(74) *Attorney, Agent, or Firm* — Shook, Hardy & Bacon L.L.P.

(57) ABSTRACT

Systems and methods are provided for tracking System Management Facility (SMF) record types using a small array. An index entry can be modified by adding an extension that tracks what record types are missing, rather than what record types are included in a particular history file. As log data comprising a plurality of history files is received, a flag bit in the header of each history file indicates that the associated history file comprises extended record types. An extension is added to each of the index entries associated with the history files that contain extended record types. Extensions may indicate record type gaps in the associated history file. Upon receiving a query for a particular record type of data stored in the data store, the extension can be utilized to determine which history files do not have the particular record type and can be skipped in the search.

20 Claims, 4 Drawing Sheets

TRACKING A LARGE VARIETY OF RECORD TYPES WITH A SMALL ARRAY

BACKGROUND

Datacenters are large clusters of components (e.g., hardware and/or software resources) that are connected to perform operations using massive amounts of data. Storing and retrieving metrics received from these components is a complex task. In addition, as the amount of data grows and the amount of data sources grows system performance and efficiency becomes paramount, particularly when indexing or retrieving particular history files. One traditional method is to rely on a defined set of record types to identify the source of and/or contents of the metrics. Currently, a control file or the mainframe storage management (e.g., Source Control Data Set (SCDS)) manages record types during a dump process in a dump index with a 256-bit (32-byte) array. The individual bits are turned on as record types are found during the dump process. The bits of the array are stored in an index entry of the control file. The index entry is then associated with the dumped history file which enables metrics corresponding to a particular record to be searchable based on a record type.

Recent modifications to the operating systems of data centers have changed the possible record type addressing such that it is orders of magnitudes larger than in previous systems. As a result, the traditional bit array tracking system, if implemented with the new addressing system, creates an array that is impracticable to create or use. As usage of large systems and infrastructures increases the amount of data to be stored, it is advantageous to employ methods and systems that allow for the efficient storage and retrieval of data. Even more, enhanced methods and systems are needed to increase the flexibility of onboarding new components to the datacenter without taking the time and expense currently required to re-design the database(s). Attempts have been made to provide a technological solution to overcome these deficiencies, but conventional technology has generally failed to provide an adequate solution. As such, the present disclosure is meant to address the deficiencies of the prior technology.

SUMMARY

This summary is provided to introduce a selection of concepts in a simplified form that are further described below in the detailed description. This summary is not intended to identify key features or essential features of the claimed subject matter, nor should it be used as an aid in determining the scope of the claimed subject matter.

Embodiments of the present disclosure relate to tracking System Management Facility (SMF) record types by using a small array. More particularly, an index entry is modified by adding an extension that tracks what record types are missing, rather than what record types are included in a particular history file. To do so, as log data comprising a plurality of history files is received, it is determined whether a flag bit in the header of each of the history files indicates that the associated history file comprises extended record types. An index entry for each of the plurality of history files is created that enables a user to query a data store storing the data. An extension is added to each of the index entries associated with the history files that contain extended record types. Extensions may indicate record type gaps in the associated history file. Upon receiving a query for a particular record type of data stored in the data store, the extension can be utilized to determine which history files to search for the particular record type identified by the query by first identifying which history files do not have the particular record type.

For example, upon receiving a query for data stored in a data store, the query may identify a particular record type of the data. In response to receiving the query, a first index entry may be accessed. The first index entry corresponds to a first history file of the data. If a first extension of the first index entry indicates that the particular record type is within a record type gap of the first history file, it is determined not to search the first history file for the particular record type because the record type gap indicates that the particular record type is missing from the first history file. Upon accessing a second index entry corresponding to a second history file of the data and determining that the second extension indicates that the particular record type is not within a record type gap of the second history file, the second history file is searched for the particular record type.

BRIEF DESCRIPTION OF THE DRAWINGS

The present invention is described in detail below with reference to the attached drawing figures, wherein.

DETAILED DESCRIPTION

Figure 1:
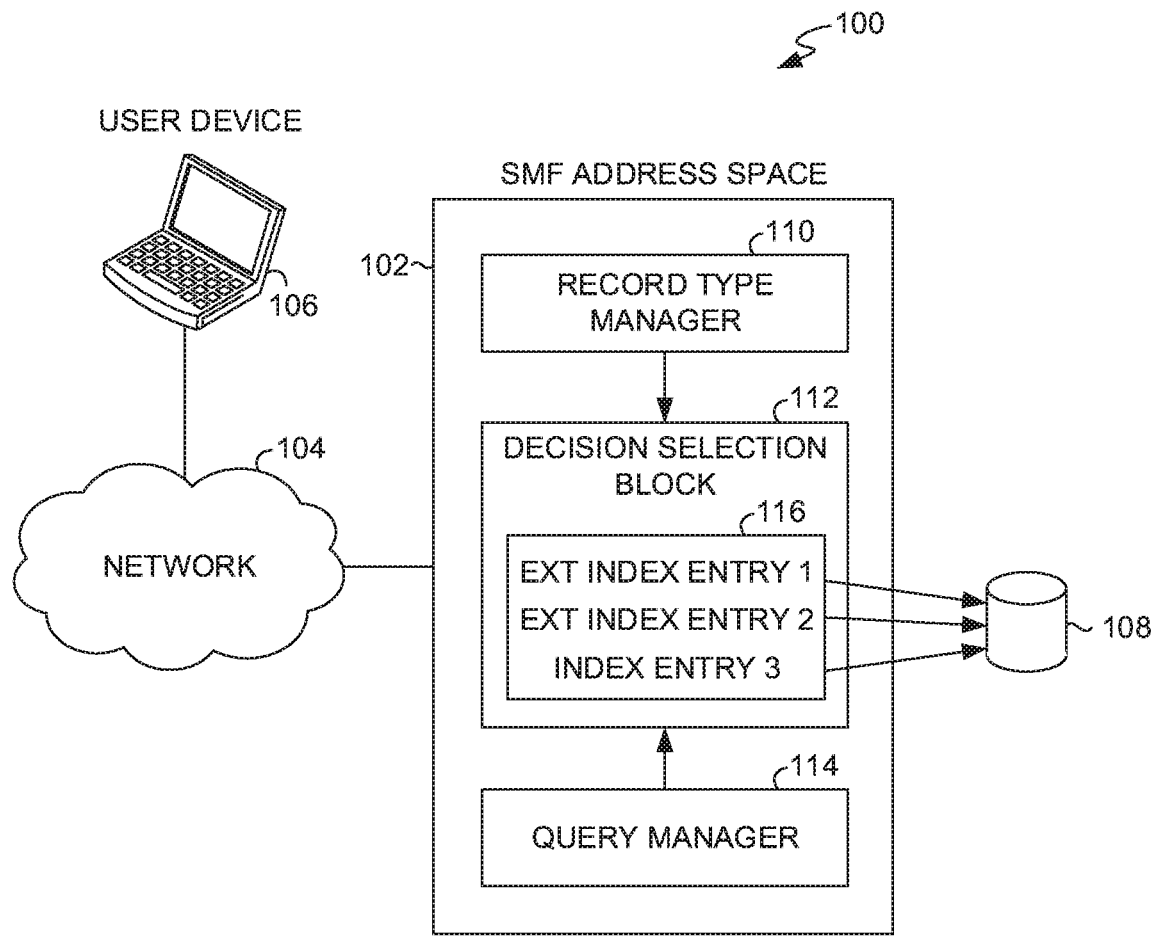
FIG. 1 is a block diagram of an exemplary system for storing and retrieving metric data, in accordance with an embodiment of the present disclosure.

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. For example, although this disclosure refers to storing and retrieving data related to datacenters in illustrative examples, aspects of this disclosure can be applied to all types of data. Moreover, although the terms "step" and/or "block" may be used herein to connote different elements of methods employed, the terms should not be interpreted as implying any particular order among or between various steps herein disclosed unless and except when the order of individual steps is explicitly described. As used herein, the singular forms "a," "an," and "the" are intended to include the plural forms as well, unless the context clearly indicates otherwise.

The term "component" as used herein encompasses both hardware and software resources. The term component may refer to a physical device such as a computer, server, router, etc., a virtualized device such as a virtual machine or virtualized network function, or software such as an application, a process of an application, database management system, etc. A component may include other components. For example, a server component may include a web service component, which may include a web application component.

As previously set forth in the Background, datacenters are large clusters of components (e.g., hardware and/or software resources) that are connected to perform operations using massive amounts of data. Efficient storage and retrieval of historic data related to these datacenters is important in maintaining the efficiency of the datacenter itself. Many datacenters track the sources, hardware and/or software, of data through specialized record type indicators. These indicators may be assigned by an operating system and utilized by a specialized component of the datacenter computer, sometimes called a SMF. The SMF uses the record type indicators, in part, to provide a complete instrumentation of all baseline activities for the datacenter, including input/output, network activity, software usage, error conditions, processor utilization, and so on. Users of the datacenter can then query information from many different historical data files by referencing record types.

For example and not limitation, record types 70 through 79 may refer to historical files containing data that relates to performance and usage instrumentation of datacenter resources such as processors, memory, disk, cache, workload, virtual storage, and so on. Type 80 records may refer to historical files containing data that relates to security issues, such as for example password violations, denied resource access attempts, and similar security concerns. A user interested in analyzing the effect that security concerns had on data center performance and instrumentation usage may query for record types 70 through 79 and record type 80. It will be understood by those skilled in the art that this query is merely exemplary in nature and the specific record type values may vary by mainframe/datacenter operating system and/or operator customization.

Historically, there were 256 SMF record types (0-255). However, recent modifications to the operating systems of data centers have changed the possible record type addressing such that it is orders of magnitudes larger than previous systems. As a result, the traditional bit array tracking system used by SMF's, if implemented with the new addressing system, creates an array that is impracticable to create or use. For example, one new record type addressing altered the possible record types from type 0 through type 255 to type 0 through 2047, with the possibility of extending the record type range up to type 65,535 (0-65,535). A bit array capable of holding all of these newly possible record types would need to be 65,536-bit (8192 byte) array.

As usage of large systems and infrastructures increases so too does the amount of data to be stored. It is advantageous to employ methods and systems that allow for the efficient storage and retrieval of data. Even more, enhanced methods and systems are needed to increase the flexibility of onboarding new components and software, which may use the extended record type addressing, to the datacenter while maintaining compatibility with legacy components and software, which may use the legacy record type addressing. All the while, it is advantageous to provide the increased efficiency of both storage and analysis, the flexibility of compatibility with legacy and new components without taking the time and expense currently required to re-design the database(s). Attempts have been made to provide a technological solution to overcome these deficiencies, but conventional technology has generally failed to provide an adequate solution. As such, the present disclosure is meant to address the deficiencies of the prior technology.

This newly created flexibility creates at least two technological problems. First, the index entries have a fixed size. This size, which is governed by the management software address space is generally well below the potentially 8192 bytes needed to account for every possible record type and any bit map of sufficient size is no longer possible. In other words, historically, the record type (0-255) was indicated for a specific record with 1 bit of information. A bit map of all possible record types present within a set of records (data set) could be tracked with a 32-byte bit map (array). The newer versions of the operating system indicate record types by an unsigned binary two-byte field, which creates the possibility of 65,536 record types (0-65,535). A bit map of all possible record types present within a data set requires a 8192 byte bit map (array), which is far beyond the normally contemplated capacity of the index entry.

Second, even if current index entries were capable of holding the larger record type bit array, the processing requirements needed to analyze multiple index entries is exponentially larger and would drastically slow down everything from query processing to backup operations and utility functions. The embodiments described herein overcome these technical problems and improve upon the methods and systems by, in part, modifying the structure and nature of the index entries as described herein.

Accordingly, embodiments of the present disclosure relate to tracking SMF record types by using a small array. More particularly, an index entry is modified by adding an extension that tracks what record types are missing, rather than what record types are included in a particular history file. To do so, as log data comprising a plurality of history files is received, it is determined whether a flag bit in the header of each of the history files indicates that the associated history file comprises extended record types. An index entry for each of the plurality of history files is created that enables a user to query a data store storing the data. An extension is added to each of the index entries associated with the history files that contain extended record types. Extensions may indicate record type gaps in the associated history file. Upon receiving a query for a particular record type of data stored in the data store, the extension can be utilized to determine which history files to search for the particular record type identified by the query.

For example, upon receiving a query for data stored in a data store, the query may identify a particular record type of the data. In response to receiving the query, a first index entry may be accessed. The first index entry corresponds to a first history file of the data. If a first extension of the first index entry indicates that the particular record type is within a record type gap of the first history file, it is determined not to search the first history file for the particular record type because the record type gap indicates that the particular record type is missing from the first history file. Upon accessing a second index entry corresponding to a second history file of the data and determining that the second extension indicates that the particular record type is not within a record type gap of the second history file, the second history file is searched for the particular record type.

In a first embodiment of the present disclosure, a method for creating a queryable index entry capable of tracking record types beyond type 255 is provided that does not require additional array capacity is provided. The method includes receiving data from a log stream, the data comprising a plurality of history files, each history file having a header. The method also includes determining, for each of the plurality of history files, whether a flag bit in the header indicates that the associated history file comprises extended record types. Further, the method includes creating an index entry for each of the plurality of history files, each index entry enabling a user to query a data store storing the data. The method continues by adding an extension to the index entry for each of the plurality of history files having the flag bit indicating that the associated history file comprises extended record types, the extension indicating record type gaps in the associated history file. Upon receiving a query for a particular record type of data stored in the data store, the method includes utilizing the extension to determine which history files to search for the particular record type identified by the query.

A second aspect is directed to a method for querying a plurality of history files through record types in one or more index entries. The method includes receiving a query for data stored in a data store, the query identifying a particular record type of the data. Further, in response to receiving the query, the method may access a first index entry corresponding to a first history file of the data. The method also includes determining that a first extension of the first index entry indicates that the particular record type is within a record type gap of the first history file. The method includes determining not to search the first history file for the particular record type.

A third aspect is directed a system for creating a queryable index entry capable of tracking record types beyond type 255 is provided that does not require additional array capacity is provided. The system includes a processor and a computer storage medium storing computer-usable instructions. The instructions cause the processor to receive data from a log stream, the data comprising a plurality of history files, each history file having a header. Further, the instruction include determining, for each of the plurality of history files, whether a flag bit in the header thereof indicates that the associated history file comprises extended record types. Additionally, the instructions cause the processor to create an index entry for each of the plurality of history files, each index entry enabling a user to query a data store storing the data. Yet further, the instructions cause the processor to add an extension to the index entry for each of the plurality of history files having the flag bit indicating that the associated history file comprises extended record types, the extension indicating record type gaps in the associated history file.

Referring initially to FIG. 1, exemplary environment 100 suitable for embodiments described herein is depicted. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

As shown in FIG. 1, environment 100 comprises SMF Address Space 102, network 104, user device 106, and data repository 108. SMF Address Space 102 generally operates to enable a record type manager 110, a decision control block 112, and a query manager to receive and analyze data objects, receive and process queries, and/or write/read queryable index entries.

The SMF address space 102 may comprise a record type manager 110, a decision control block 112, one or more a control files 116, and a query manager 114. Generally, SMF address space may exist at least partially within a mainframe computer and/or datacenter. The record type manager 110 is generally configured to analyze data objects loaded into the SMF address space 102. For instance, during a data dump, a data object may be loaded into the SMF address space 102 and accessed by record type manager 110. Record type manager 110 may analyze the contents of the data object, such as one or more history files, and track the record types present within the data object. Further, record manager 110 may cause the decision control block 112 to build an index entry corresponding to the data object and/or one or more history files. For example, a data object may be dumped by a mainframe using a SMF dump utility (not depicted). The data object may comprise one or more history files containing mainframe and/or datacenter data. The data object may then be loaded into the SMF address space 102. The record type manager 110 may access the data object and analyze the contents for record type values indicating the presence of data from the one or more sources indicated by the record type value. The record type manager 110 may directly and/or indirectly facilitate the creation of an index entry (e.g., EXT INDEX ENTRY 1, EXT INDEX ENTRY 2, and/or INDEX ENTRY 3) in a control file 116. In some embodiments, the record type manager 110 builds the index entry directly. In some embodiments, the record type manager 110 builds the index entry indirectly through a decision control block 112, which may further process the record type information prior to indexing.

Generally, decision control block 112 is configured perform read and/or write functions for a control file, such as control file 116. For instance, the decision control block 112 may receive input from the record type manager 110 and write, based on that information, an index entry which is held in the control file 116. Further, the decision control block 112 may receive input from the query manager 114 and read index entries held in one or more control files, such as control file 116.

The network 104 may include, without limitation, one or more local area networks (LANs) and/or wide area networks (WANs). Such networking environments are commonplace in offices, enterprise-wide computer networks, intranets, and the Internet. It should be understood that any number of datacenters and/or database servers may be employed by the system 100 and is within the scope of the present disclosure. Each may comprise a single device or multiple devices cooperating in a distributed environment. Additionally, other components (e.g., monitored components) may also be included within the network environment.

The user device 106 communicates the query to the query manager with the intention to retrieve the data relevant to the query stored in the data repository 108. Additionally, and/or alternatively, a mainframe job may be submitted that indicates what data the query manager should gather. Further, the mainframe job (query) may indicate an output file defined as the location of where to write the data once the query manager identifies and gathers data that is responsive to the mainframe job (query). The mainframe job (query) may be submitted in any suitable way.

Data repository 108 is generally configured to store archived history files and/or data objects. The data repository 108 may comprise one, more than one, and/or a plurality of history files and/or data objects. Further, each history file and/or data object may be located within the same datacenter as the SMF address space 102, as depicted in FIG. 1, and/or may be located remotely and accessible through network 104.

Figure 2:
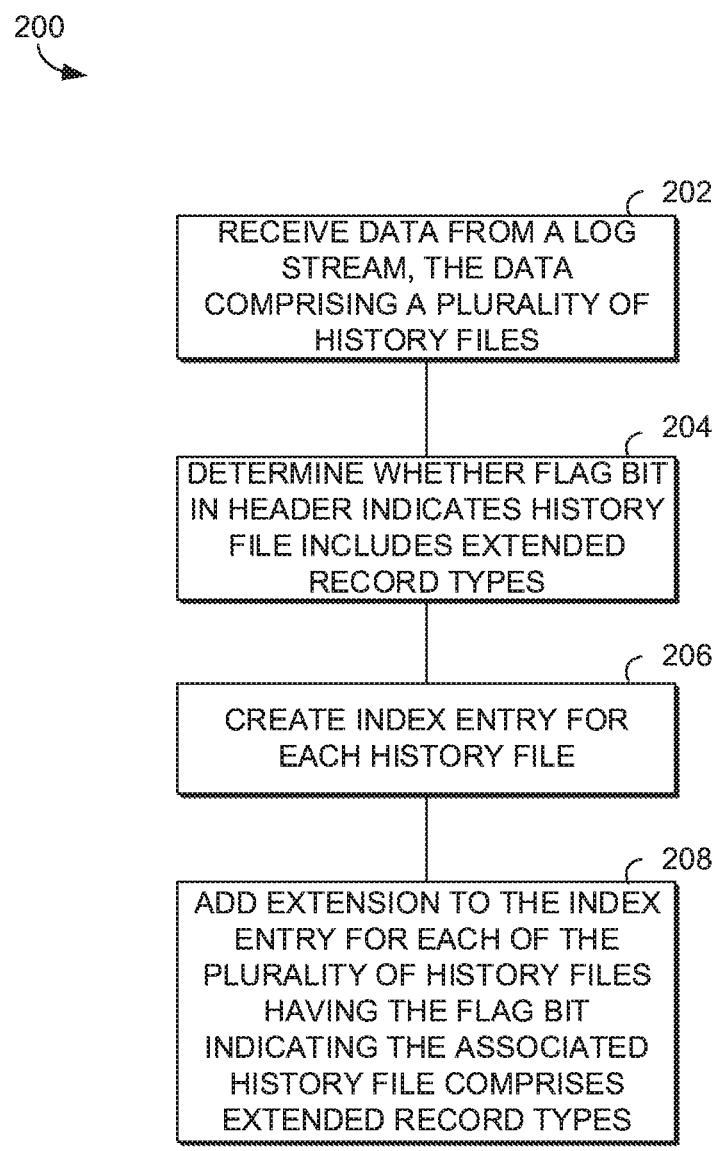
FIG. 2 is a block diagram of an exemplary method for building an index entry for distributed environment, in accordance with an embodiment of the present disclosure.

Turning to FIG. 2, an exemplary method 200 for creating a queryable extension to an index entry is provided. As shown in FIG. 2, some embodiments of method 200 comprise receiving a plurality of data objects, determining whether a flag bit in the header of the data objects indicates that the history file includes extended record types, creating an index entry for each history file, adding an extension to the index entry for each of the plurality of history files having the flag bit indicating the associated history file comprises extended record types. Some embodiments of method 200 are suitable for implementation in environment 100.

At block 202, a data object comprising a plurality of history files is received. The data object may be received from an I/O processor(s) and/or any other source associated with a mainframe or datacenter. The data object may be loaded into a dedicated SMF address space, such as SMF address space 102. For example, the record type manager 110 may capture a log stream or data dump, through a batch process and/or intercept command, and load the data set into the SMF address space. The SMF may then track the record types present in the data object. For instance, the data object may comprise at least one history file with data from record types 70, 80, 89, 300, 301, 302, 305, 400, 525, 1019, and 1020.

At block 204, the plurality of history files are analyzed to determine whether a flag bit in the header of the history file indicates that the history file includes extended record types. Additionally, and/or alternatively, block 204 comprises tracking the set of record types indicated in the history file. For example, the record type manager 110 may analyze a history file and determine that the history files contains data associated with record types 70, 80, 89, 300, 301, 302, 305, 400, 525, 1019, and 1020. Further, in some embodiments the record types present within the history file are compared to a predetermined threshold, which is based on a record type value. The predetermined threshold is used, at least in part, to determine whether the history file contains record types above a value for which the datacenter and/or mainframe operator has determined that a bit array is an effective indexing technique. For instance, in an embodiment, a predetermined threshold is 255. In such an embodiment, history files containing only data associated with record types 0 through 255 may be indexed in an index entry of the control file 116 (such as INDEX ENTRY 3) in a 256-bit array. However, history files containing at least one record type above record type 255 (i.e. ≥256) may be indexed in an index entry of the control file 116 with an extension index entry. Thus for example, if the illustrative history file is determined to contain record types 70, 80, 89, 300, 301, 302, 305, 400, 525, 1019, and 1020 it may be determined that at least one record type is above the predetermined threshold. Here there are multiple record types above the predetermined threshold; however, it will be understood by those skilled in the art that the predetermined threshold record type value may be any value and that any number of record types above the predetermined threshold is sufficient to trigger an index entry extension. Additionally, in an embodiment, the predetermined threshold is a null value or not used. As would be understood by those in the art; in such an embodiment, the index entry extension may be used to record all record types present in the history file regardless of record type values present as described herein.

At block 206, an index entry for each history file is created. In some embodiments, the results of the analysis of the history file are stored in SMF address space until each index entry is created. The index entry may correspond to a specific history file, and indicate the record types for data contained in the history file. In some embodiments, if the history file does not contain a flag bit indicating the presence of extended record types, 32-byte bit array may be built, at block 206, indicating the presence or absence of each of the non-extended record types 0-255. In such a case, method 200 may end at block 206. However, in some embodiments, a flag bit may be set in the header of the history file based on any predetermined record type value or based on the presence of any history file including an extended record type. For example, a predetermined record type value may be record type 127, 255, or 2047. In some embodiments, if the history file does contain record types above a predetermined threshold a bit array indicating the presence or absence of each record type less than or equal to the predetermined threshold is written to the index entry. For example, if the predetermined threshold hold is set to record type 255, a bit array may be written, at block 206, indicating that record types 70, 80, 89 are present in the corresponding history file if the history file contains data associated with record types 70, 80, 89, 300, 301, 302, 305, 400, 525, 1019, and 1020.

At block 208, an extension is added to the index entry for each of the plurality of history files having a header with the flag bit indicating the corresponding history file comprises extended record types. In some embodiments, an extension is added to the index entry for each of the plurality of history files if any (or if none) of the plurality of history files have a header with the flag bit indicating the corresponding history file comprises extended record types. In this way, even if the history files are not all extended record types, all of the history files may take advantage of the extended index entries, as described herein. Further, in some embodiments, the record types detected in the history file that are above the predetermined threshold are analyzed to determine a minimum SMF record type above the predetermined threshold, the maximum record type above the predetermined threshold, and/or the gaps between the record types beyond the predetermined threshold. For instance, for the exemplary history file containing record types 70, 80, 89, 300, 301, 302, 305, 400, 525, 1019, and 1020; a record type manager and/or decision control block may write a bit array indicating record types 70, 80, and 89 in the index entry corresponding to the history file in block 206. Further, the record type manager identify record type 300 has the minimum SMF record type above the predetermined threshold (illustrative set at record type 255). Further, the maximum record type may be identified as record type 1020. Yet still further, several record type gaps may be identified above the predetermined threshold. In some embodiments, the record type gaps are identified between the minimum record type and the maximum record type. For instance, a record type gap exists in the illustrative example from record type 303-record type 304. In other words, the history file does not contain data corresponding to record types 303 and 304. Further, another gap exists between record type 306 and record type 399; another gap exists from 401-524; and another gap exists from 526-1018. The record type manager 110 and/or decision control block 112 may then write the index entry extension information (i.e. the minimum record type, maximum record type, and the identified record type gaps) to the index entry. Further, in some embodiments the number of identified gaps is determined and included in the index entry extension. For example, in this exemplary case four gaps are identified. Thus, the index entry extension for a history file containing data associated with record types 70, 80, 89, 300, 301, 302, 305, 400, 525, 1019, and 1020 may be:

Minimum: 300
Maximum: 1020
Gap Count: 4
Gap 1: 303-304
Gap 2: 306-399
Gap 3: 401-524
Gap 4: 526-1018.

It should be understood by those skilled in the art that the actual formatting of the index entry and index entry extension may vary from this illustrative example without departing from the scope of the embodiments described herein. For example, the index entry extension may be formatted in a single string, hex, binary, and/or any other formatting conventions. Thus, for instance the index entry extension may be: 012C 03FC 0004 012F 0130 0132 018F 0191 020C 020E 03FA.

Further, some embodiments of method 200 comprise comparing the number of identified gaps to a gap capacity. Based on the number of gaps and the gap capacity the index entry extension may be supplemented with additional null values. For instance if the gap capacity is seven (7) gaps and only four (4) gaps are identified, such as with the illustrative example, the index entry extension may be supplemented with null values for the three (3) unused gaps. Thus, for example, the illustrative example may be Minimum: 300
Maximum: 1020
Gap Count: 4
Gap 1: 303-304
Gap 2: 306-399
Gap 3: 401-524
Gap 4: 526-1018
Gap 5: 0000
Gap 6: 0000
Gap 7: 0000.

Additionally, the index entry extension may be formatted in a single string, hex, binary, and/or any other formatting conventions. Thus, for instance the index entry extension may be: 012C 03FC 0004 012F 0130 0132 018F 0191 020C 020E 03FA 0000 0000 0000 0000 0000 0000.

Further, in some embodiments, if the number of gaps identified exceeds the gap capacity of the index entry extension the number of gaps included in the index entry extension is reduced to fit the gap capacity. For instance, the gap, which covers the smallest number of record types not present in the history file, may be omitted. As such, in some embodiments the size of the identified gaps are compared to each other to determine the gaps coving the largest number of record types. Further, based on the size comparison the smallest gap may be eliminated from the index entry extension. Thus for the illustrative example, gap 1 may be determined to cover 2 record types (303 and 304), gap 2 may be determined to cover 94 record types (306 through 399), and so on. In such an embodiment, where the gap capacity is set at three (3) gaps, gap 1 would be omitted from the index entry extension. It will be understood by those skilled in the art that the gap capacity may be any number of gaps without departing from the scope of the embodiments described herein. For instance, in some embodiments the gap capacity is seven, less than seven, and/or more than seven gaps.

Figure 3:
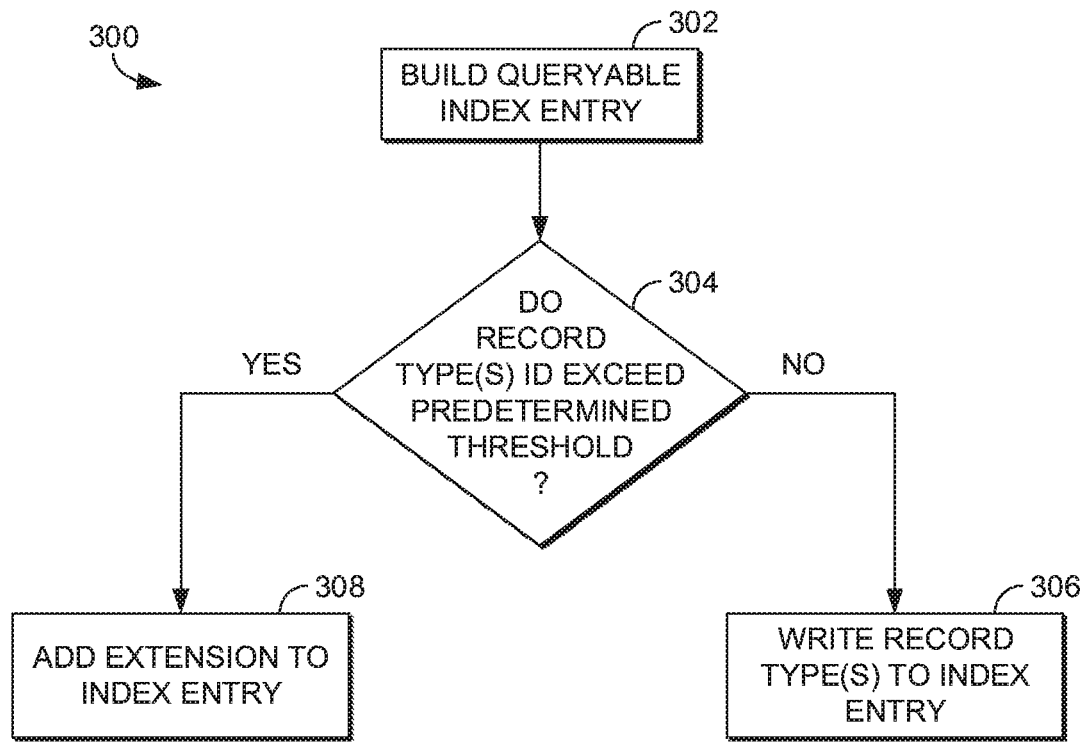
FIG. 3 illustrates an exemplary index data structure, in accordance with an exemplary embodiment of the present disclosure.

Turning to FIG. 3, an exemplary method 300 is provided for building index entries. At block 302, the queryable index entry is triggered to be built. In some embodiments, building the queryable index is triggered by record type manager 110 in response to a data object being loaded into SMF address space 102. The data object may be one or more log streams, dump files, and/or any other suitable data-containing file. The data object may be analyzed to determine which record types are present. For instance, in some embodiments a log stream including at least one history file is loaded into the SMF address space. The record type manager may scan the contents of the history file and detect the presence of a set of record types. The record type manager may identify the record types contained within the history file through any suitable method. For instance in an embodiment, the record type manager identifies the record types by reading a two byte unsigned binary field(s) associated with the contents of the history file. The record type manager may track the record types indicated by each two byte unsigned binary field within the history file. For example, the history file may contain data associated with record types 300, 301, 302, 305, 400, 525, 1019. It will be understood by those skilled in the art that the history file may contain any number of record types, the record types may be contained in the history file in any order and in any combination. The preceding record type values are merely exemplary and intended to serve merely as an illustrative example; as such, they are not intended to limit the scope of embodiments described herein.

At block 304, it is determined whether any of the record types exceed a predetermined threshold. The predetermined threshold may be any record type value. For example, the predetermined threshold may be record type value 127, 255, 2047, or any other suitable record type value. In some embodiments, the record types indicated by the two byte unsigned binary field are compared to the predetermined threshold to determine whether the history file contains record types above the predetermined threshold. Additionally, and/or alternatively, a flag bit contained within the header of the history file may indicate the presence of record types beyond the predetermined threshold.

At block 306, record types are written to an index entry if the record types do not exceed the predetermined threshold. The collection of record types present in the history file may be written in the index entry in a 256-bit (32-byte) array. At block 308, an extension to the index entry is added if the record types exceed the predetermined threshold. In some embodiments, a flag bit in the header of the history file and/or a value of 126 (x'7E') in the record type field indicates that record types above the predetermined threshold are present in the history file. For example, the record type manager may identify a flag bit in the SMF header of the history file indicating the presence of record types beyond 255. Further, the record type manager may write the minimum SMF record type above the predetermined threshold, the maximum record type above the predetermined threshold, and/or the gaps between the record types beyond the predetermined threshold.

Put another way, the record type manager may identify the record type actually present within the history file with the smallest record type value above the predetermined threshold; the minimum SMF record type above the predetermined threshold. The record type manager may also identify the record type actually present within the history file with the largest record type value above the predetermined threshold; the maximum SMF record type value above the predetermined threshold. The record type manager may also identify at least one range of record type values not present within the history file. For example, the record type manager may observe that a history file containing data associated with record types 300, 301, 302, 305, 400, 525, 1019, 1020 is loaded into the SMF address space. The record manager may then determine that the predetermined threshold is record type values greater than or equal to record type 256. In some embodiments, the record type manager determines that the history file contains data associated with record types greater than the predetermined threshold, in this case record type 256, by a flag bit in the header of the history file. In some embodiments, the record type manager determines that the history file contains data associated with record types greater than the predetermined threshold, again in this case record type 256, by comparison of the observed record types to the predetermined threshold. As this illustrative example contains record types above the predetermined threshold, record type manager 110 may instruct decision control block 112 to build an index entry containing a queryable index entry extension. The decision control block 112 may create a new extended index entry indicating: the minimum record type value present within the observed record types of the history file, here record type 300; the maximum record type value present within the observed record types of the history file, here record type 1020; the number of gaps present between the minimum and maximum record type values, here there are 4 gaps; and/or, the record type gaps present, here the first gap is between record types 303 and 304, the second gap is between record types 306 and 399, the third gap is between 401 and 524, and the fourth gap is between record type 526 and 1018. Thus, the index entry for the illustrative history file containing record types 300, 301, 302, 305, 400, 525, 1019 may be:

Minimum: 300
Maximum: 1020
Gap Count: 4
Gap 1: 303-304
Gap 2: 306-399
Gap 3: 401-524
Gap 4: 526-1018.

It should be understood by those skilled in the art that the actual formatting of the index entry and index entry extension may vary from this illustrative example without departing from the scope of the embodiments described herein. For example, the index entry extension may be formatted in a single string, hex, binary, and/or any other formatting conventions. Further, additional and/or alternative steps may be incorporated into exemplary method 300. For example, steps discussed in relation to method 200 may be incorporated into method 300.

Figure 4:
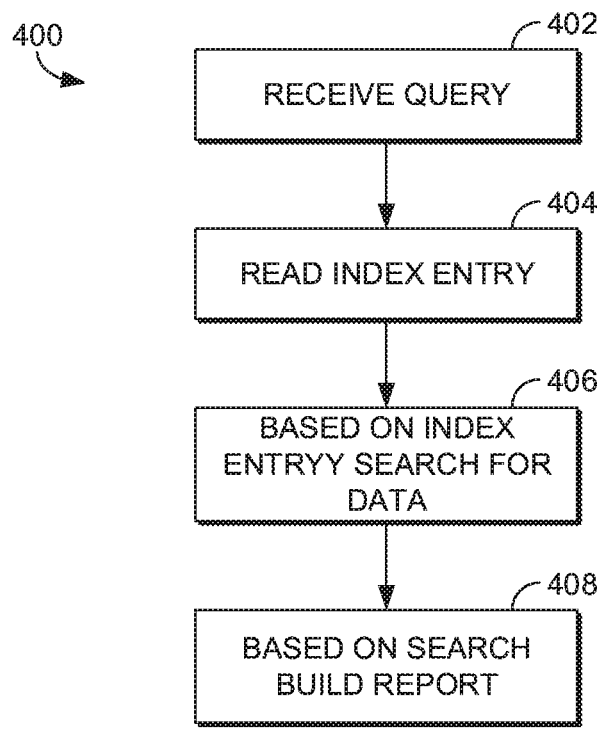
FIG. 4 illustrates an exemplary inventory data structure, in accordance with an exemplary embodiment of the present disclosure.

Turning to FIG. 4, an exemplary method 400 is provided for using an index entry to build a report based on a received query. Some embodiments of method 400 begin at block 402 where a query for at least one record type is received. For example, a query may be received from user device 106 through network 104 and received by query manager 114. The query may be for a record type, more than one record type, and/or a plurality of record types. It will be understood by those skilled in the art that the query may include other information that may further define the query without departing from the scope of embodiments described herein.

At block 404 index entries are read and analyzed based on the query to determine whether a record type is present within the history file associated with the index entry. The analysis may be based on the query received in block 402. For instance, a query may contain one or more record types. The record types may be identified by the query manager 114. An index entry may be read and analyzed to identify matches between the query and a bit array indicating the presence of record types in the history file associated with the index entry. Additionally, the index entry may contain a flag bit imbedded in the index entry header which may indicate that the index entry, and thus the history file, contain record types above a predetermined threshold. In some embodiments, the flag bit is an indication that the index entry contains an index entry extension. For instance, the index entry extension may indicate at least one of the minimum record type value above a predetermined threshold, a maximum record type value above the predetermined threshold, a number of record type gaps, and identification of the record type gaps. The information within the index entry extension may be used by a query manager to identify the absence of the queried record types. For example, the index entry extension may indicate that the minimum record type value present in the history file is 300. If the query was for record type 275 and the predetermined threshold is 255, the minimum record type of 300 indicates that record type 275 is not present in the history file. The query can then proceed to the search the next index entry. For another example, the index entry extension may indicate that the maximum record type value present in the history file is 1020. If the query is for record type 2240, the record type is not present within the history file and the query can proceed to search the next index entry. For another example, the index entry extension may indicate that there are four gaps present (gap 1: 303-304; gap 2: 306-399; gap 3: 401-524; gap 4: 526-1018), the minimum record type value is 300, and the maximum record type value is 1020. If a query is for record types 300-305, 400, 525 and 1017-1050 the query manager may determine that record type 300 is present within the history file (as it is the minimum record type present). Record types 301, 302 may be present as there is no gap covering this range. Record types 303-304 are not present as there is a gap covering this range. Record type 305 may be present. Record type 400 and 525 may be present. Record type 1017 and 1018 are not present. Record type 1019 may be present. Record type 1020 may be present. Record types 1021-1050 are not present.

At block 406, the history files associated with the index entries are searched for data corresponding to the record type specified by the query and only where gaps are not present. Based on the results of the query, data corresponding to the requested record types may be retrieved. At block 408, a report is built based on the search of the history files. For example, the report may indicate which history files have data responsive to the query. The report may indicate the data associated with the queried record types contained in the history files.

Figure 5:
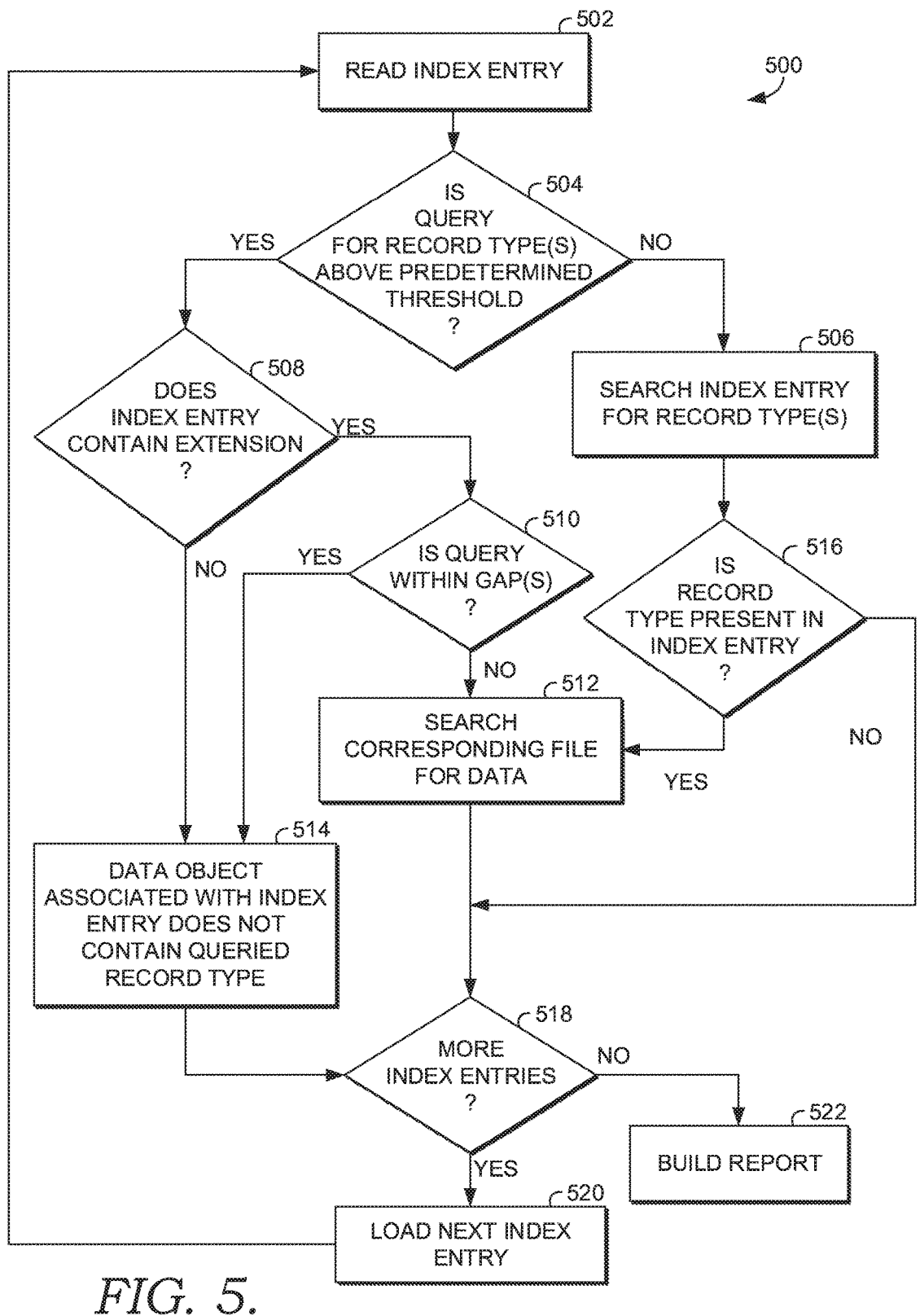
FIG. 5 a flow diagram is illustrated showing an exemplary method that stores metric data, in accordance with embodiments of the present disclosure.

Turning to FIG. 5, an exemplary decision logic 500 is provided for using extensions of index entries to identify record types above a predetermined threshold and build a report based on the received information associated with the index entry. It will be understood that exemplary decision logic may comprise additional and or alternative steps and/or be implemented as a subroutine, subprocess, and/or sublogic in a larger overall process. For example, some embodiments of decision logic 500 may be incorporated into method 400. Additionally, some embodiments of decision logic 500 are suitable for implementation in environment 100.

Some embodiments of logic 500 begin at block 502 by reading an index entry. For instance in response to receiving a query, query manager 114 may trigger decision control block 112 to examine at least one index entry contained within the control file 116. At block 504 determine whether the query for the record types exceeds a predetermined record type threshold. In some embodiments, the predetermined record type threshold is the same predetermined threshold discussed in reference to FIG. 3. For instance, the predetermined record type threshold may be record type value 127, 255, 2047, or any other suitable record type value.

If the record above the predetermined threshold, at block 508, the index entry is evaluated to determine whether it contains an extension. In some embodiments the index entry contains a flag bit which indicates whether the history file associated with the index entry contains record types above the predetermined threshold. Additionally, the index entry may contain a specific record type that serves to verify that the history file associated with the index entry contains record types above the predetermined threshold.

If the index entry contains the extension, at block 510, the extension is analyzed to determine whether the queried record types fall within the gaps identified extension of the index entry. Additionally, block 510 may also determine whether the queried record types are greater than or equal to the minimum record type and/or less than or equal to the maximum record type.

If the queried record type falls within the gaps, is less than the minimum, and/or greater than the maximum identified by the index entry embodiments of decision logic 500 proceed to block 514. At block 514, it is determined that the data object and/or history file associated with the index entry does not contain the queried record type. At block 518, it is determined whether the control file contains more index entries. If the control file contains more index entries embodiments of decision logic 500 proceeds to block 520. If, on the other hand, the control file contains no more index entries embodiments of decision logic 500 proceed to block 522 where a report is built.

Returning to block 510, if the queried record type does not fall within the gaps, is greater than or equal to the minimum, and less than or equal to the maximum the data object and/or history file associated with the index entry may contain the queried record type. At block 512, the data object and/or history file associated with the index entry may be loaded into the SMF address space, such as SMF address space 100, and searched for data associated with the queried record type. At block 518, it is determined whether there are more index entries to query. If there are no more index entries a report may be built at block 522. If there are more index entries to query the next index entry may be loaded at block 520.

Returning briefly to block 504, if the record is not above the predetermined threshold by its decision logic 500 proceeds to block 506. At block 506, the index entry array is searched for record types indicated by the query. At block 516 is determined whether or not the queried record type is present within the index entry array. If the index entry array contains the queried record type embodiments of decision logic 500 proceed to block 512. At block 512, the history file associated with the index entry is searched for data associated with the record type queried. At block 518, it is determined if more index entries exist within the control file and the next index entry is loaded at block 520 or the report is built at block 522.

Returning briefly to block 516, if the record type is not present within the index entry array, at block 518, it is determined if more index entries exist within the control file and the next index entry is loaded at block 520 or the report is built at block 522.

As can be understood, embodiments of the present disclosure provide for storing and retrieving metric data. The present disclosure has been described in relation to particular embodiments, which are intended in all respects to be illustrative rather than restrictive. Alternative embodiments will become apparent to those of ordinary skill in the art to which the present disclosure pertains without departing from its scope.

From the foregoing, it will be seen that this disclosure is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. A computer implemented method comprising:
receiving data from a log stream, the data comprising a plurality of history files, each history file having a header;
for each of the plurality of history files, determining whether a flag bit in the header thereof indicates that the associated history file comprises extended record types;
creating an index entry for each of the plurality of history files, each index entry enabling a user to query a data store storing the data;
adding an extension to the index entry for each of the plurality of history files having the flag bit indicating that the associated history file comprises extended record types, the extension indicating record type gaps in the associated history file, a minimum record type present in the associated history file, a maximum record type present in the associated history file, and a total number of record type gaps present in the associated history file; and
upon receiving a query for a particular record type of data stored in the data store, utilizing the extension to determine which history files to search for the particular record type identified by the query.

2. The computer implemented method of claim 1, wherein utilizing the extension to determine which history files to search for the particular record type identified by the query comprises:
accessing a first extended index entry corresponding to a first history file;
determining a first extension of the first extended index entry indicates that the particular record type is within a record type gap of the first history file; and
determining not to search the first history file.

3. The computer implemented method of claim 2, further comprising:
accessing a second extended index entry corresponding to a second history file;
determining a second extension of the second extended index entry indicates that the particular record type is not within a record type gap of the second history file; and searching the second history file for the particular record type.

4. The computer implemented method of claim 3, further comprising creating an output file comprising the particular record type.

5. The computer implemented method of claim 1, wherein the extension further indicates up to seven record type gaps present in the associated history file.

6. The computer implemented method of claim 5, further comprising, upon the associated history file comprising more than seven record type gaps, identifying a size of each record type gap, the size indicating a number of record types in each record type gap.

7. The computer implemented method of claim 6, further comprising identifying the seven record type gaps having the largest size.

8. The computer implemented method of claim 1, wherein the data is system management facility (SMF) data.

9. The computer implemented method of claim 8, wherein the flag bit is designated in an unsigned two-byte binary field.

10. A method comprising:
receiving a query for data stored in a data store, the query identifying a particular record type of the data;
in response to receiving the query, accessing a first index entry corresponding to a first history file of the data;
determining that a first extension of the first index entry indicates that the particular record type is within a record type gap of the first history file, wherein the first extension includes record type gaps in the corresponding first history file, a minimum record type present in the corresponding first history file, a maximum record type resent in the corresponding first history file, and a total number of record type gaps present in the corresponding first history file; and
determining not to search the first history file for the particular record type.

11. The method of claim 10, further comprising:
accessing a second index entry corresponding to a second history file of the data;
determining that a second extension of the second index entry indicates that the particular record type is not within a record type gap of the second history file; and
searching the second history file for the particular record type.

12. The method of claim 10, further comprising creating an output file comprising the particular record type.

13. The method of claim 10, wherein the data is system management facility (SMF) data.

14. The method of claim 10, wherein the second extension indicates a minimum record type present in the corresponding to a second history file, a maximum record type present in the corresponding to a second history file, a total number of record type gaps present in the corresponding to a search history file, and up to seven record type gaps present in each respective history file.

15. A system comprising:
a processor; and
a computer storage medium storing computer-usable instructions that, when used by the processor, cause the processor to:
receive data from a log stream, the data comprising a plurality of history files, each history file having a header;
for each of the plurality of history files, determining whether a flag bit in the header thereof indicates that the associated history file comprises extended record types;
create an index entry for each of the plurality of history files, each index entry enabling a user to query a data store storing the data; and
add an extension to the index entry for each of the plurality of history files having the flag bit indicating that the associated history file comprises extended record types, the extension indicating record type gaps in the associated history file, a minimum record type present in the associated history file, a maximum record type resent in the associated history file, and a total number of record type gaps present in the associated history file.

16. The system of claim 15, wherein the processor is further caused to, upon receiving a query for a particular record type of data stored in the data store, utilize the extension to determine which history files to search for the particular record type identified by the query.

17. The system of claim 15, wherein the processor is caused to utilize the extension to determine which history files to search for the particular record type identified by the query by:
accessing a first extended index entry corresponding to a first history file;
determining a first extension of the first extended index entry indicates that the particular record type is within a record type gap of the first history file; and
determining not to search the first history file.

18. The system of claim 16, wherein the processor is further caused to utilize the extension to determine which history files to search for the particular record type identified by the query by:
accessing a second extended index entry corresponding to a second history file;
determining a second extension of the second extended index entry indicates that the particular record type is not within a record type gap of the second history file; and
searching the second history file for the particular record type.

19. The system of claim 18, wherein the processor is further caused to create an output file comprising the particular record type.

20. The system of claim 15, wherein the data is system management facility (SMF) data and the flag bit is designated in an unsigned two-byte binary field.

* * * * *